United States Patent [19]
Huffman

[11] Patent Number: 5,059,459
[45] Date of Patent: Oct. 22, 1991

[54] PAPERBOARD LAMINATE

[75] Inventor: Todd H. Huffman, Roanoke, Va.

[73] Assignee: Westvaco Corporation, New York, N.Y.

[21] Appl. No.: 352,937

[22] Filed: May 17, 1989

[51] Int. Cl.$^5$ .................. B65D 85/00; B32B 27/08
[52] U.S. Cl. .................. 428/34.2; 428/36.7; 428/349; 428/512; 428/516; 428/342; 264/80; 264/211.12
[58] Field of Search ............ 428/34.2, 36.7, 349, 428/512, 516, 342

[56] References Cited
U.S. PATENT DOCUMENTS

| | | | |
|---|---|---|---|
| 4,289,830 | 9/1981 | Knott, II | 428/411 |
| 4,513,036 | 4/1985 | Thompson et al. | 428/35 |
| 4,701,360 | 10/1987 | Gibbons et al. | 428/516 |
| 4,789,575 | 12/1988 | Gibbons et al. | 428/34.2 |
| 4,802,943 | 2/1989 | Gibbons et al. | 156/244.23 |

OTHER PUBLICATIONS

A. L. Blackwell, "High Barrier Polymer", 1986, Tappi Press Coextension Seminar, pp. 13–18.
"Barrier Coextrusion Coating as a Foil Replacement in Paperboard Lamination" presented by Dragan Djordjevic of Er–We–Pa at the ASEPTIPAK '84 Conference in Princeton, N.J. on Apr. 4–6, 1984.

Primary Examiner—P. C. Sluby

[57] ABSTRACT

A non-foil paperboard laminate having improved resistance to the migration of essential oils, flavors and Vitamins in liquid packaging and improved oxygen barrier characteristics for both liquid and dry packaging comprises paperboard sandwiched between two layers of a heat-sealable, low density polyethylene polymer and including a symmetrical five component barrier layer coextruded onto the surface of one of the low density polyethylene layers. The barrier layer comprises low density polyethylene/adhesive tie layer/ethylene vinyl alcohol copolymer/adhesive tie layer/low density polyethylene.

6 Claims, 1 Drawing Sheet

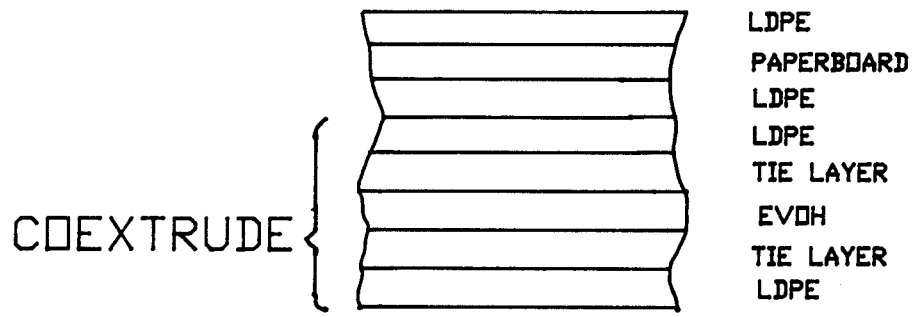
FIG. 1
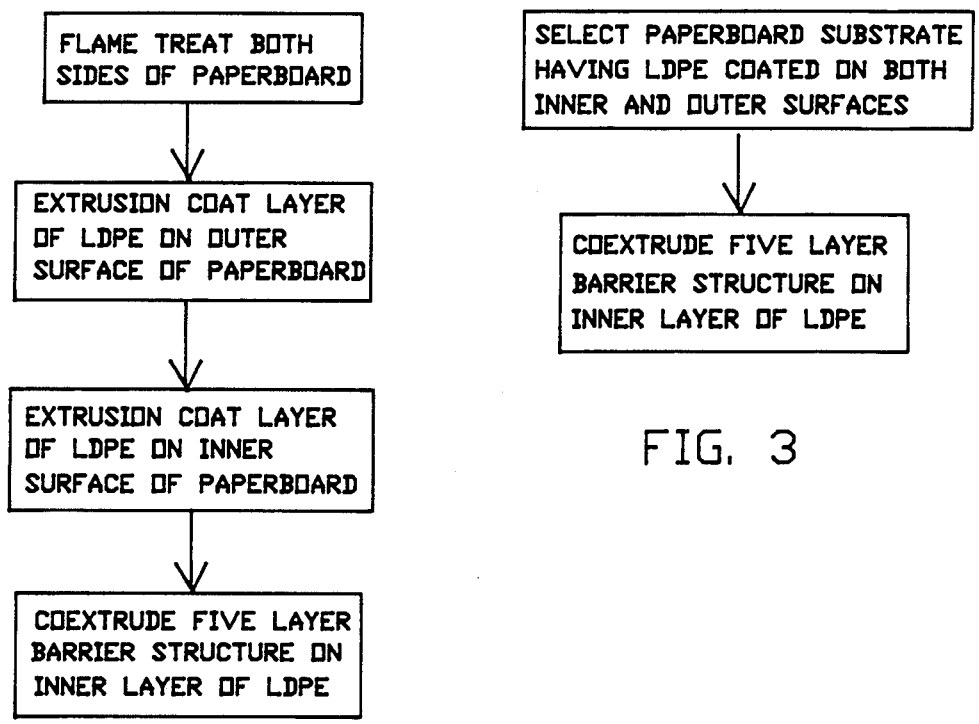
FIG. 2
FIG. 3

PAPERBOARD LAMINATE

BACKGROUND OF INVENTION

The present invention relates to paperboard laminates, and more particularly to a non-foil paperboard laminate useful for making containers for products such as fruit or citrus juices, beverages and the like as well as non-liquid dry products, wherein the laminate has good oxygen barrier characteristics as well as the ability to protect the products packaged therein against the loss of essential oils, flavor and Vitamins. Paperboard coated with low density polyethylene has been used for this purpose, but it falls short of providing an acceptable container, therefore additional barrier materials are required to achieve the desired goal. It is well known that impermeable materials such as aluminum foil, polar materials such as polyamides, polyethylene terephthalates, polyvinylidene chlorides, polyvinyl chlorides, etc., and highly crystalline non-polar materials such as high density polyethylene and polypropylene provide good gas barrier characteristics and varying degrees of barrier to the absorption and/or transmission of non-polar citrus juice flavor oils such as d-Limonene et al. However, when additional barrier materials are added to such structures, the manufacturing process becomes complex because of the basic incompatibility of some added materials with paperboard and low density polyethylene. Nevertheless, polyethylene is the most desirable material to have on both the inner and outer surfaces of such a laminate in order to achieve reliable and easy heat sealability when containers are formed.

U.S. Pat. Nos. 4,789,575 and 4,802,943 disclose a product and process for the manufacture of a laminate structure having inner and outer layers of polyethylene including an additional barrier material, but the method for making the laminate requires more complex manufacturing steps than the present invention and achieves a structure having less reliability in the field. U.S. Pat. No. 4,513,036 discloses another structure having inner and outer layers of polyethylene, but the polypropylene barrier material does not provide very good performance against the loss of essential oils and Vitamin C. Other prior art related to the present invention is described in U.S. Pat. No. 4,289,830 which discloses a multi-layer, coextruded film incorporating a barrier structure substantially as used in the present invention; a reprint from PLASTICS WORLD, July 1984 entitled "Barrier plastics challenge foil", which discloses a barrier structure applied to paper substantially as used in the present invention; and, a publication of TAPPI PRESS entitled "High Barrier Polymers", presented at the 1986 TAPPI Coextrusion Seminar, Marriott Hilton Head, Hilton Head, SC, April 1-3 1986, which also shows a typical barrier structure as disclosed herein in the form of a film. Nevertheless, the invention disclosed and claimed herein is deemed to be unobvious over the teachings of this prior art.

SUMMARY OF INVENTION

It is an object of the present invention to provide an improved heat-sealable, non-foil laminate for fruit or citrus juices, beverages and the like as well as non-liquid dry products which is easy to manufacture and which provides reliable performance in the field. In one embodiment of the present invention, an existing commercial structure for paperboard cartons comprising paperboard sandwiched between two layers of low density polyethylene (LDPE) is selected as the base material. Subsequently, in a single manufacturing step, a symmetrical, five layer barrier structure comprising LDPE/tie layer/ EVOH/tie layer/LDPE is as used herein "EVOH" has its art-recognized meaning of an ethylene vinyl alcohol copolymer as described, for example, in the article "EVAL Resins: Ethylene Vinyl Alcohol (EVOH) Barrier Resins for Barrier Packaging Applications" published at Vol. II pages 264-271 of *Polymer News*, 1986, in the paper entitled "High Barrier Polymers" by A.L. Blackwell published at pages 13-18 of the 1986 TAPPI Coextrusion Seminar Notes and in U.S. Pat. Nos. 4,284,830, 4,789,575, 4,802,943 and 4,950,510 coextruded onto the surface of one of the layers of LDPE. The coextrusion step can be accomplished without any independent treatment to the LDPE layer of the base material because the adjacent LDPE/LDPE interfaces are compatible with one another. In an alternative embodiment, the laminate can be made in-line by selecting a paperboard substrate, flame treating or corona discharge treating both sides of the paperboard substrate, extrusion coating a layer of LDPE onto the outer surface of the paperboard substrate, extrusion coating a layer of LDPE onto the inner surface of the paperboard substrate, and coextruding the aforementioned five layer structure onto the inner layer of LDPE. The final structure yields a construction which includes polyethylene on its inner and outer surfaces to provide the most desirable heat sealable characteristics, but which is much simpler to manufacture than the prior art structures. Cartons constructed from the laminate of the present invention provide excellent gas barrier protection for dry products and significant flavor oil retention and prevention of loss of Vitamin C of the citrus juices contained therein, resulting in an extended shelf like for the products.

BRIEF DESCRIPTION OF DRAWING

FIG. 1 is a cross-sectional elevation of the laminate of the present invention;

FIG. 2 is a block diagram representing a process for making the laminate of the present invention; and FIG. 3 is a block diagram representing an alternative process for manufacturing the laminate of the present invention.

DETAILED DESCRIPTION

In a preferred embodiment of the present invention the laminate is prepared as follows:

Stepwise, the paperboard substrate is flame or corona treated on both surfaces. Second, a layer of LDPE is extrusion coated onto one surface of the paperboard at a temperature in excess of 600 degrees F. to achieve a good bond to the paperboard.

Thirdly, a layer of LDPE is extrusion coated onto the other surface of the paperboard at the same temperature as the first layer. And lastly, a five layer sandwich of EVOH surrounded by Plexar tie layers and LDPE covering layers is coextruded onto one of the first layers of LDPE applied to the paperboard at a temperature substantially less than 600 degrees F. to prevent degradation of the EVOH and tie layers.

The newly formed laminate is arranged so that the five layer coextrusion becomes the inner surface or liquid contact surface of any containers made from the laminate, and the laminate is scored, cut into blanks, folded and side seam heat-sealed in a conventional manner. The prepared blanks are ready for filling and sealing on conventional equipment in the normal manner. In an alternative embodiment the five layer sandwich is coextruded directly onto a base material comprising paperboard sandwiched between two layers of low density polyethylene (LDPE).

The barrier laminate produced by the present invention exhibits excellent barrier properties and meets FDA approval for use in food contact packaging. As an example, the laminate of the present invention may comprise an exterior coating of about 7-12 lbs/ream LDPE, paperboard of varying thickness (depending on carton size), an interior coating of about 7-14 lbs/ream LDPE and a coextruded sandwich layer applied to the interior coating of LDPE comprising about 4-7 lbs/ream LDPE, 2-4 lbs/ream of an adhesive tie layer (Plexar 177), 4-9 lbs/ream EVOH (Eval EP), 2-4 lbs/ream tie layer (Plexar 177) and a product contact layer of about 4-7 lbs/ream LDPE. As used herein "Plexar 177" has its art-recognized meaning of an ethylene based copolymer modified with functional groups available from Quantum Chemical Corporation, as described, for example in U.S. Pat. Nos. 4,950,510 and Re 33,376. The preferred EVOH is sold under the product name Eval EP resin and is available from Eval Company of America. The preferred tie layer is Plexar 177 and is available from Quantrum Chemical Corporation, Any commercial extrusion grade of LDPE is suitable for use in the present invention. Ream size is 3000 sheets 25×38 inches.

Even though EVOH is an excellent oxygen barrier, its performance is greatly affected by relative humidity (RH). Thus, for packaging a dry food product, the RH susceptibility of the EVOH can be reduced by increasing the thickness of the LDPE layer adjacent to the coextrusion layer. This permits modifications of the coat weights of LDPE applied to the paperboard while still retaining a symmetrical coextruded layer within the limits described.

It will thus be seen that the laminate of the present invention provides barrier characteristics equivalent to the most desirable products disclosed in the prior art, but is much simpler and easier to manufactures than the laminates disclosed in the prior art. It should also be understood that the coat weights set forth above in a typical example may be reduced or modified as desired depending upon the intended use for the product being manufactured.

What is claimed is:

1. A paperboard container, the container being constructed from a laminate comprising:
    (a) a paperboard substrate having opposed inner and outer surfaces;
    (b) a layer of a heat-sealable, low density polyethylene polymer coated onto the outer surface of said paperboard substrate:
    (c) a layer of a heat-sealable, low density polyethylene polymer coated onto the inner surface of said paperboard substrate: and,
    (d) an inner, product contact sandwich layer comprising a heat-sealable, low density polyethylene polymer layer, a tie layer, a ethylene vinyl alcohol copolymer layer, a tie layer, and a heat-sealable, low density polyethylene polymer layer coextruded onto the outer surface of the heat-sealable, low density polyethylene polymer applied to the inner surface of said paperboard substrate.

2. The product of claim 1 wherein the product contact sandwich layer is symmetrical.

3. The product of claim 2 wherein about 7-12 lbs/ream of heat-sealable, low density polyethylene polymer is coated onto the outer surface of said paperboard substrate.

4. The product of claim 3 wherein about 7-14 lbs/ream of heat-sealable, low density polyethylene polymer is coated onto the inner surface of said paperboard substrate.

5. The product of claim 4 wherein the inner, product contact sandwich layer coextruded onto the polyethylene polymer applied to the inner surface of said paperboard substrate may comprise about 4-7 lbs/ream low density polyethylene, 2-4 lbs/ream tie layer, 4-9 lbs/ream ethylene vinyl alcohol copolymer, 2-4 lbs/ream tie layer, and about 4-7 lbs/ream low density polyethylene.

6. The product of claim 5 wherein said tie layer is a modified ethylene base copolymer tie material.

* * * * *

UNITED STATES PATENT AND TRADEMARK OFFICE
CERTIFICATE OF CORRECTION

PATENT NO.  : 5,059,459

DATED       : October 22, 1991

INVENTOR(S) : Todd H. Huffman

It is certified that error appears in the above-identified patent and that said Letters Patent is hereby corrected as shown below:

Column 2, line 4, after the word "is", please insert --coextruded onto the surface of one of the layers of LDPE."; line 4, "as" should read --As--; line 14, add a period --.-- after "4,950,510", and cancel "coextruded onto the surface of one of the layers of LDPE."

Signed and Sealed this

Twenty-third Day of February, 1993

Attest:

STEPHEN G. KUNIN

Attesting Officer

Acting Commissioner of Patents and Trademarks